United States Patent
Ferreol et al.

(10) Patent No.: US 7,400,297 B2
(45) Date of Patent: Jul. 15, 2008

(54) METHOD FOR THE BLIND WIDEBAND LOCALIZATION OF ONE OR MORE TRANSMITTERS FROM A CARRIER THAT IS PASSING BY

(75) Inventors: Anne Ferreol, Colombes (FR); Dominique Heurguier, Le Perreux sur Marne (FR)

(73) Assignee: Thales (FR)

(*) Notice: Subject to any disclaimer, the term of this patent is extended or adjusted under 35 U.S.C. 154(b) by 178 days.

(21) Appl. No.: 11/085,253

(22) Filed: Mar. 22, 2005

(65) Prior Publication Data
US 2005/0242995 A1  Nov. 3, 2005

(30) Foreign Application Priority Data
Mar. 30, 2004  (FR) .................................. 04 03295

(51) Int. Cl.
    H01Q 3/00   (2006.01)
    H04B 5/00   (2006.01)
    Q01S 3/02   (2006.01)
(52) U.S. Cl. ..................................... 342/377; 342/463
(58) Field of Classification Search ............ 342/357.09, 342/377, 417, 430–431, 449, 451, 463–465
    See application file for complete search history.

(56) References Cited

U.S. PATENT DOCUMENTS 5,909,646 A   6/1999 Deville
6,163,297 A * 12/2000 Rose ........................... 342/418

OTHER PUBLICATIONS

J. Sheinvald et al., Localization of multiple sources with moving arrays, IEEE Transactions on Signal Processing, vol. 46(10), p. 2736-2743, Oct. 1998.*
Cardoso J F et al: "Bline Beamforming for Non-Gaussian Signals" vol. 140, No. 6, Dec. 1, 1993, pp. 362-270.
Schmidt R O : "Multiple emitter location and signal parameter estimation" IEEE Transactions on antenna and propagation, IEEE Inc. New York, US, vol. Ap-34, No. 3, Mar. 1, 1986, pp. 276-280.

* cited by examiner

Primary Examiner—Thomas H. Tarcza
Assistant Examiner—Fred H. Mull
(74) Attorney, Agent, or Firm—Lowe Hauptman Ham & Berner, LLP

(57) ABSTRACT

A method for localizing one or more sources, the source or sources being in motion relative to a network of sensors, comprises a step for the separation of the sources in order to identify the direction vectors associated with the response of the sensors to a source at a given incidence. The method comprises the following steps of associating the direction vectors $a_{1p(1)m} \ldots a_{Kp(K)m}$ obtained for the $m^{th}$ transmitter and, respectively, for the instants $t_1 \ldots t_K$ and for the wavelengths $\lambda_{p(1)}, \ldots, \lambda_{p(K)}$, and localizing the $m^{th}$ transmitter from the components of the vectors $a_{1p(1)m} \ldots a_{Kp(K)m}$ measured with different wavelengths.

18 Claims, 2 Drawing Sheets

METHOD FOR THE BLIND WIDEBAND LOCALIZATION OF ONE OR MORE TRANSMITTERS FROM A CARRIER THAT IS PASSING BY

RELATED APPLICATIONS

The present application is based on, and claims priority from, France Application Number 04 03295, filed Mar. 30, 2004, the disclosure of which is hereby incorporated by reference herein in its entirety.

BACKGROUND OF THE INVENTION

1. Field of the Invention

The invention relates to a method for localizing a plurality of ground transmitters in a broadband context from the passing by of carrier without a priori knowledge on the signals sent. The carrier may be an aircraft, a helicopter, a ship, etc.

The method is implemented, for example iteratively, during the passing by of the carrier.

2. Description of the Prior Art

The prior art describes different methods to localize one or more transmitters from a passing carrier.

FIG. 1 illustrates an example of airborne localization. The transmitter 1 is in the position $(x_0,y_0,z_0)$ and the carrier 2 at the instant $t_k$ is at the position $(x_k,y_k,z_k)$ and perceives the transmitter at the incidence $(\theta(t_k,x_0,y_0,z_0),\Delta(t_k,x_0,y_0,z_0))$. The angles $\theta(t,x_0,y_0,z_0)$ and $\Delta(t,x_0,y_0,z_0)$ evolve in time and depend on the position of the transmitter as well as the trajectory of the carrier. The angles $\theta(t,x_0,y_0,z_0)$ and $\Delta(t,x_0,y_0,z_0)$ are identified as can be seen in FIG. 2 relative to a network 3 of N antennas capable of being fixed under the carrier.

There are many classes of techniques used to determine the position $(x_m,y_m,z_m)$ of the transmitters. These techniques differ especially in the parameters instantaneously estimated at the network of sensors. Thus, localising techniques can be classified under the following categories: use in direction-finding, use of the phase difference between two distant sensors, use of the measurement of the carrier frequency of the transmitter, use of the propagation times.

The patent application FR 03/13128 by the present applicant describes a method for localising one or more transmitters from a passing carrier where the direction vectors are measured in the same frequency channel and are therefore all at the same wavelength.

The method according to the invention is aimed especially at achieving a direct estimation of the positions $(x_m,y_m,z_m)$ of each of the transmitters from a blind identification of the direction vectors of the transmitters at various instants $t_k$ and various wavelengths $\lambda_k$.

Parametrical analysis will have the additional function of separating the different transmitters at each wavelength-instant pair $(t_k, \lambda_{p(k)})$. The parameters of the vectors coming from the different pairs $(t_k, \lambda_{p(k)})$ are then associated so that, finally, a localisation is performed on each of the transmitters.

SUMMARY OF THE INVENTION

The invention relates to a method for localizing one or more sources, said source or sources being in motion relative to a network of sensors, the method comprising a step for the separation of the sources in order to identify the direction vectors associated with the response of the sensors to a source at a given incidence. It is characterised in that it comprises at least the following steps:

associating the direction vectors $a_{1p(1)m} \ldots a_{Kp(K)m}$ obtained for the $m^{th}$ transmitter and, respectively, for the instants $t_1 \ldots t_K$ and for the wavelengths $\lambda_{p(1)} \ldots, \lambda_{p(k)}$, localizing the $m^{th}$ transmitter from the components of the vectors $a_{1p(1)m} \ldots a_{Kp(K)m}$ measured for the different wavelengths.

The wideband method according to the invention offers notably the following advantages:

the localising of the transmitter is done by a direct method which maximises a single criterion as a function of the (x,y,z) coordinates of the transmitter, it makes it possible to achieve an association of the direction vectors of the sources in the time-frequency space, making it possible especially to take EVF (Evasion de Fréquence=Frequency Evasion) and TDMA-FDMA (Time Division Multiple Access and Frequency Division Multiple Access) signals into account, it can be implemented on calibrated networks or with amplitude diversity antennas such as co-localised antennas: namely antennas in a network with dipoles having a same phase centre and different orientations.

BRIEF DESCRIPTION OF THE DRAWINGS

Other features and advantages of the present information shall appear more clearly from the following description of a detailed example, given by way of an illustration that in no way restricts the scope of the invention, and from the appended figures, of which.

DETAILED DESCRIPTION OF THE DRAWINGS

Figure 1:
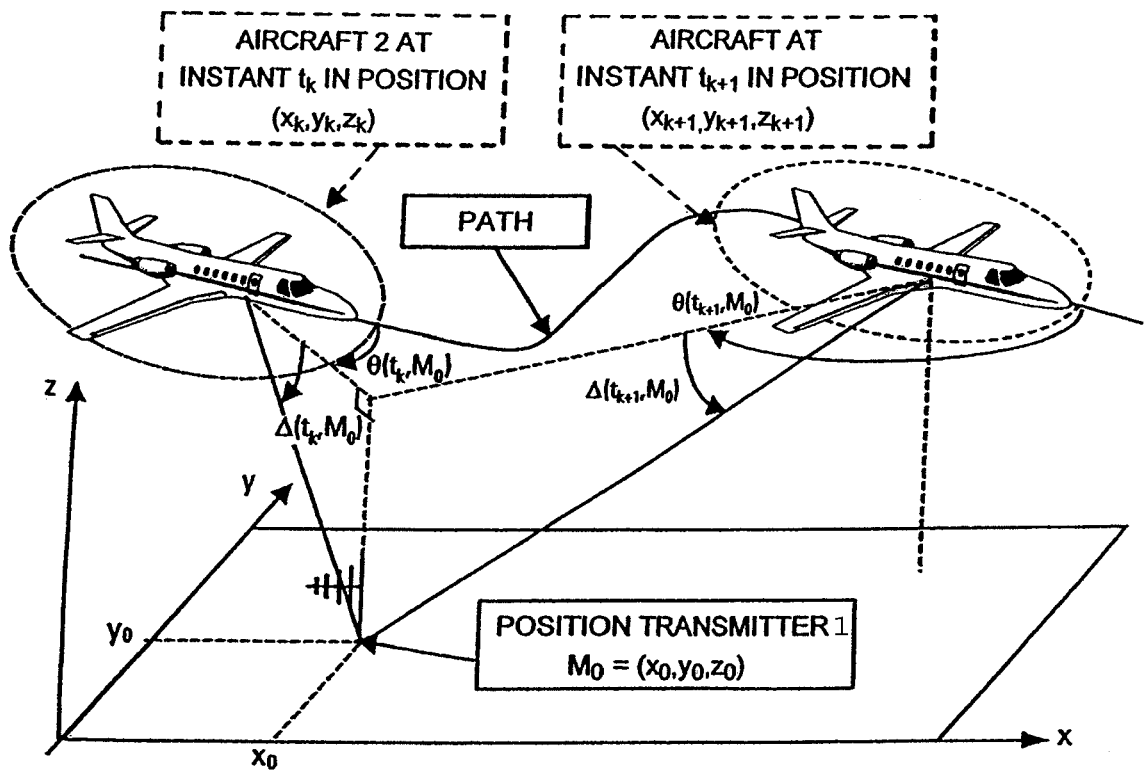
FIG. 1 exemplifies a localisation, by an aircraft equipped with a network of antennas, of a transmitter having a position $(x_0, y_0, z_0)$ on the ground.
Figure 2:
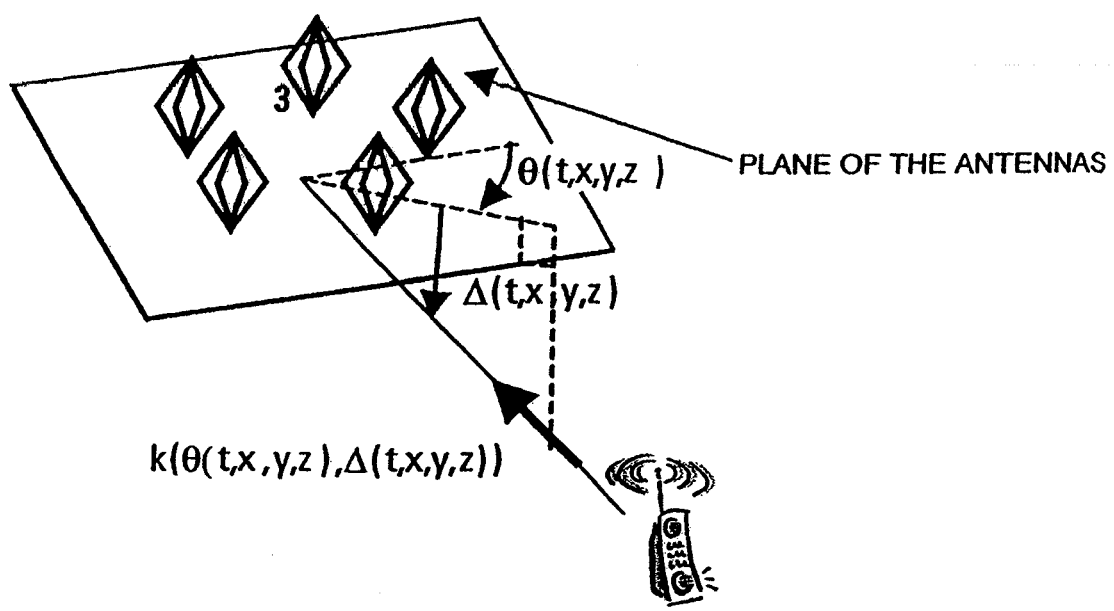
FIG. 2 shows a network of five antennas and the angles of incidence of a transmitter.

For a clear understanding of the method according to the invention, the following example is given by way of illustration that in no way restricts the scope of the invention, for a system as described in FIG. 1 comprising an aircraft 2 equipped with a reception device comprising, for example, a network of N sensors (FIG. 2), and a transmitter 1 to be localised.

Before explaining the steps of the method according to the invention, the model used is defined.

Modelling

In the presence of M transmitters, the aircraft receives the vector x(t,p) at the instant t at output of the N sensors of the network and of the $p^{th}$ channel having a wavelength $\lambda p$.

$$x(t+t_k, p) = \begin{bmatrix} x_1(t+t_k, p) \\ M \\ x_N(t+t_k, p) \end{bmatrix} \quad (1)$$

$$= \sum_{m=1}^{M} a(\theta_{km}, \Delta_{km}, \lambda_p) s_m(t+t_k) + b(t+t_k)$$

$$= A_{kp} s(t+t_k, p) + b(t+t_k, p) \text{ for } |t| < \Delta t/2$$

where b(t) is the noise vector assumed to be Gaussian, $a(\theta,\Delta,\lambda)$ is the response of the network of sensors to a source with an incidence $(\theta,\Delta)$ and a wavelength $\lambda$, $A_{kp}=[a(\theta_{k1},\Delta_{k1},\lambda_p) \ldots a(\theta_{kM},\Delta_{kM},\lambda_p)]$ corresponds to the mixing matrix, $s(t)=[s_1(t) \ldots s_M(t)]^T$ corresponds to the direction vector, $\theta_{km}=\theta(t_k,x_m,y_m,z_m)$ and $\Delta_{km}=\Delta(t_k,x_m,y_m,z_m)$.

$x_n(t, p)$ is the signal received on the $n^{th}$ sensor of the carrier at output of the $p^{th}$ frequency channel associated with the wavelength $\lambda_p$.

In this model, the mixing matrix $A_{kp}$ depends on the instant $t_k$ of observation as well as on the wavelength $\lambda_p$.

The above model shows that the direction vector:

$$a_{kpm}=a(\theta_{km},\Delta_{km},\lambda_p)=a(t_k,\lambda_p,x_m,y_m,z_m) \text{ of the } m^{th} \text{ transmitter} \quad (2)$$

at the instant $t_k$ is a known function of $(t_k,\lambda_p)$ and of the position of the transmitter $(x_m,y_m,z_m)$.

Figure 3:
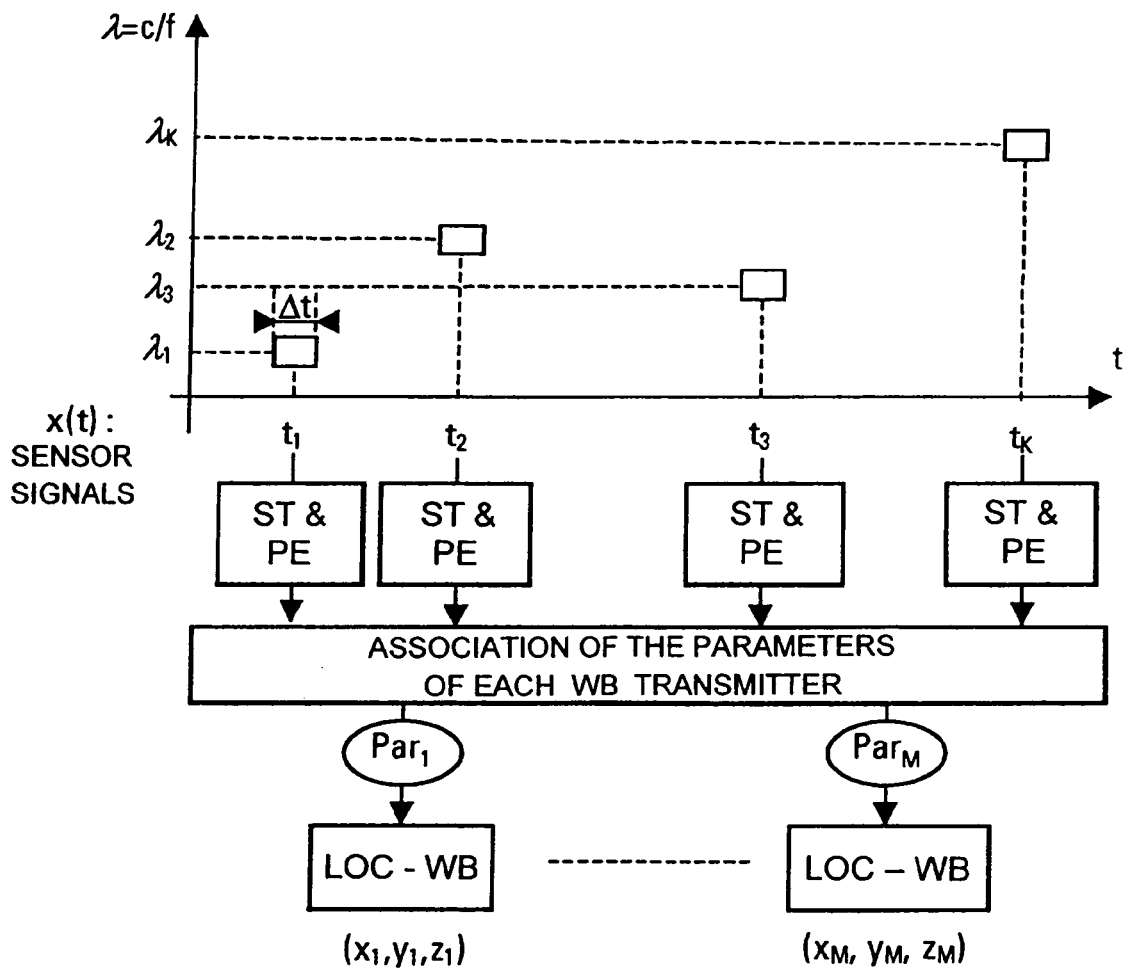
FIG. 3 is a graph showing the general operations of the method in the presence of M wideband transmitters.

The method according to the invention comprises, for example, the following steps summarised in FIG. 3 the parametrical estimation (PE) and the separation of the transmitters (ST) at the instant $t_k$ and wavelength $\lambda_p$ for example in identifying the vectors $a_{kpm}$ for $(1 \leq m \leq M)$.

This first step is effected by techniques of source separation and identification described, for example, in the references [2] [3], the association of the parameters for the $m^{th}$ transmitter, for example in associating the vectors $a_{1p(1)m}$ up to $a_{Kp(K)m}$ obtained at the respective pairs (instants, wavelength) $(t_1,\lambda_{p(1)}) \ldots (t_K,\lambda_{p(K)})$.

The direction vectors $a_{kpm}$ are considered in a (time, wavelength) space or, again, in a (time, frequency) space, the frequency being inversely proportional to the wavelength, The localizing of the $m^{th}$ transmitter from the vectors $a_{1p(1)m}$ up to $a_{Kp(K)m}$ associated, LOC-WB.

Step of Association and Tracking of the Wideband Transmitters

In the presence of M sources or transmitters, after the source separation step where the direction vectors are identified but not associated, the method gives, for the instant/wavelength pair $(t_k, \lambda_p)$, the $M_k$ signatures $a_{kpm}$ for $(1 \leq m \leq M_k)$, signature or vector associated with a source.

At the instant $t_{k'}$ and at the wavelength $\lambda_{p'}$, the source separation step gives the $M_{k'}$ vectors $b_i$ for $(1 \leq i \leq M_{k'})$. The purpose of the tracking of the transmitters is especially to determine, for the $m^{th}$ transmitter, the index $i(m)$ which minimizes the difference between the vectors $a_{kpm}$ and $b_{i(m)}$. In this case, it will be deduced therefrom that $a_{k'p'm}=b_{i(m)}$.

To make the association of the parameters for the $m^{th}$ transmitter, a criterion of distance is defined between two vectors u and v giving:

$$d(u, v) = 1 - \frac{|u^H v|^2}{(u^H u)(v^H v)} \quad (3)$$

H corresponds to the transpose of the vectors u or v

Thus, the index $i(m)$ sought verifies:

$$d(a_{kpm}, b_{i(m)}) = \min_{1 \leq i \leq M_{k'}} [d(a_{kpm}, b_i)] \quad (4)$$

In this association, we consider a two-dimensional function associated with the $m^{th}$ transmitter defined by:

$$\hat{\beta}_m(t_k,\lambda_p)=d(a_{kp(k)m}, a_{00m}) \quad (5)$$

In the course of the association, there is obtained, by interpolation of the $\hat{\beta}_m(t_k,\lambda_p)$ values for each transmitter indexed by m, a function $\beta_m(t,\lambda)$ for $1 \leq m \leq M$. This function has the role especially of eliminating the pairs $(t_k,\lambda_p)$ such that $\beta_m(t_k,\lambda_p)$ and $\hat{\beta}_m(t_k,\lambda_p)$ are very different: $|\beta_m(t_k,\lambda_p)-\hat{\beta}_m(t_k,\lambda_p)|>\eta$. Thus the aberrant instants which may be associated with other transmitters are eliminated.

Since the $\beta_m(t,\lambda)$ brings into play the distance $d(u,v)$ between the vectors u and v, it is said that u and v are close when:

$$d(u, v)<\eta \quad (6)$$

The value of the threshold $\eta$ is chosen for example as a function of the following error model:

$$u=v+e \quad (7)$$

where e is a random variable.

When the direction vectors are estimated on a duration of T samples, the law of the variable e may be approached by a Gaussian mean standard deviation law $\sigma=1/\sqrt{T}$. Thus, the distance $d(u, v)$ is proportional to a chi-2 law with $(N-1)$ degrees of freedom (N:length of the vectors u and v).

The ratio between the random variable $d(u, v)$ and the chi-2 law is equal to $\sigma/N$. With the law of e being known, it is possible to determine the threshold $\eta$ with a certain probability of false alarms.

In the steps of the association of the method, a distance $d_{ij}$ is defined in the time-wavelength space between the pairs $(t_i,\lambda_{p(i)})$ and $(t_j,\lambda_{p(j)})$:

$$d_{ij}=\sqrt{(t_i-t_j)^2+(\lambda_{p(i)}-\lambda_{p(j)})^2} \quad (8)$$

In considering that, for each pair, $(t_k,\lambda_{p(k)})$, $M_k$ vectors $a_{kp(k)j}$ $(1<j<M_k)$ have been identified, the steps of this association for K pairs $(t_k,\lambda_{p(k)})$ are given here below.

The steps of association for K instants $t_k$ and $\lambda_p$ wavelengths are, for example, the following:

Step AS1 Initialization of the process at $k=0$, $m=1$ and $M=1$. The initial number of transmitters is determined, for example, by means of a test to detect the number of sources at the instant t0, this being a test known to those skilled in the art.

For all the triplets $(t_k,\lambda_{p(k)},j)$ the initialization of a flag called flag$_{kj}$ with flag$_{kj}=0$: flag$_{kj}=0$ indicates that the $j^{th}$ direction vector obtained at $(t_k,\lambda_{p(k)})$ is not associated with any family of direction vectors.

Step AS2 Search for an index j and a pair $(t_k,\lambda_{p(k)})$ such that flag$_{kj}=0$, which expresses the fact that the association with a family of direction vectors is not achieved.

Step AS3 For this $1^{st}$ triplet $(t_k,\lambda_{p(k)},j)$, flag$_{kj}=1$ is effected and link$_{k'i}$ is initialized at link$_{k'i}=0$ for $k' \neq k$ and $i' \neq j$ and ind$_m=\{k\}$ and $\Phi_m=\{a_{kp(k)j}\}$, where $\Phi_m$ is the set of vectors associated with the $m^{th}$ family or $m^{th}$ transmitter, ind$_m$ the set of the indices k of the pairs $(t_k,\lambda_{p(k)})$ associated with the same transmitter, $link_{ki}$ is a flag that indicates whether it has performed a test of association of the vector $a_{kp(k)i}$ of of the triplet $(t_k, \lambda_{p(k)}, i)$ with the $m^{th}$ family of direction vectors: $link_{ki}=0$ indicates that the association test has not been performed.

Step AS4 Determining the pair $(t_{k'}, \lambda_{p(k')})$ minimizing the distance $d_{kk'}$ of the relationship (8) with $(t_k, \lambda_{p(k)})$ such that $k \in ind_m$ in the time-frequency space and in which there exists at least one vector $b_i = a_{kp(k')i}$ such that $flag_{k'i}=0$ and $link_{k'i}=0$; the vector has never been associated with a family on the one hand and there has been no test of association conducted with the $m^{th}$ family on the other hand. A search is made in a set of data resulting from the separation of the sources.

Step AS5 By using the relationship (4) defined here above, we determine the index i(m) minimizing the difference between the vectors $a_{kp(k)m}$ such that $k \in ind_m$ and the vectors $b_i$ identified with the instant-wavelength pairs $(t_{k'}, \lambda_{p(k')})$ for $(1 \leq i \leq M_{k'})$ and $flag_{k'i}=0$ and $link_{k'i}=0$.

Step AS6 do $link_{k'i(m)}=1$: the test of the association with $m^{th}$ family has been performed.

Step AS7 If $d(a_{kp(k)m}, b_{i(m)}) \leq \eta$ relationship (6) and $|t_k - t_{k'}| < \Delta t_{max}$ and $|\lambda_{p(k)} - \lambda_{p(k')}| < \Delta \lambda_{max}$ then perform $\Phi_m = \{\Phi_m b_{i(m)}\}$, $ind_m = \{ind_m k'\}$, $flag_{k'i(m)}=1$: The vector is associated with the $m^{th}$ family.

Step AS8 Return to the step AS4 if there is at least one doublet $(t_k, \lambda_{p(k')})$ and one index i such that the flag $link_{k'i}=0$ and $flag_{k'i}=0$.

Step AS9 In writing $K(m)=cardinal(\Phi_m)$, we obtain the family of vectors $\Phi_m = \{a_{1p(1)m} \ldots a_{K(m),p(K(m)),m}\}$ associated with the source indexed by m.

For each vector $a_{kp(k)m}$ the estimate $\hat{\beta}_m(t_k, \lambda_p)$ of (5) is associated and then a polynomial interpolation is made of the $\hat{\beta}_m(t_k, \lambda_p)$ to obtain the two-dimensional interpolated function $\beta_m(t, \lambda)$.

Step AS10 From the family of vectors $\Phi_m = \{a_{1p(1),m} \ldots a_{K(M),p(K(M)),m}\}$, extract the J instants $t_i \in ind_j \subset ind_m$ such as the coefficients $|\hat{\beta}_m(t_i, \lambda_{p(i)}) - \hat{\beta}_m(t_i, \lambda_{p(i)})| < \eta$ (threshold value) such that $\hat{\beta}_m(t_i, \lambda_{p(i)})$ is not an aberrant point of the function $\beta_m(t, \lambda)$ It is said that there is an aberrant point when the divergence in modulus between the point $\hat{\beta}_m(t_i, \lambda_{p(i)})$ and an interpolation of the function $\beta_m(t, \lambda)$ does not exceed a threshold $\eta$.

After this sorting out, the new family of pairs is $\Phi_m = \{a_{kp(k),m}/k \in ind_j\}$, $ind_m = ind_j$ and $K(M)=J$, $M \leftarrow M+1$ and $m \leftarrow M$.

Step AS11 Return to the step AS3 if there is at least one triplet $(t_k, \lambda_{p(k)}, j)$ such that $flag_{kj}=0$.

Step AS12 $M \leftarrow M-1$.

After the step AS10, we are in possession of the family of vectors $\Phi_m = \{a_{1p(1),m} \ldots a_{K(M),p(K(M)),m}\}$ having no aberrant points. Each vector has an associated function $\beta_m(t, \lambda)$ whose role especially is to eliminate the aberrant points which do not belong to a zone of uncertainty given by $\eta$ (see equations (5)(6)(7)).

The steps of the method described here above have notably the following advantages:

The number M of transmitters is determined automatically,

The following are determined for each transmitter:
  The class of vectors $\Phi_m = \{a_{1p(1),m} \ldots a_{K(m),p(K(m)),m}\}$,
  The number K(m) of direction vectors,
  A set ind of indices indicating the pairs $(t_k, \lambda_{p(k)})$ associated with the vectors of the set $\Phi_m$.

Managing the case of the appearance and disappearance of a transmitter,

Associating the transmitters in the time-wavelength space $(t, \lambda)$.

The method of association described here above by way of an illustration that in no way restricts the scope of the invention is based on a criterion of distance of the direction vectors. Without departing from the scope of the invention, it is possible to add other criteria to it such as:

the signal level received in the channel considered (criterion of correlation on the level), the instant of the start of transmission (front) or detection of a periodic marker (reference sequence), enabling the use of synchronisation criteria in the case of time-synchronised EVF signals (steady levels, TDMA, bursts, etc.), characteristics related to the technical analysis of the signal (waveform, modulation parameters . . . ), etc.

The following step is that of localising the transmitters.

The Wideband Localisation of a Transmitter

The goal of the method especially is to determine the position of the $m^{th}$ transmitter from the components of the vectors $a_{1p(1)m}$ up to $a_{Kp(K)m}$ measured with different wavelengths.

These vectors $a_{kp(k)m}$ have the particular feature of depending on the instant $t_k$, the wavelength $\lambda_{p(k)}$ and the position $(x_m, y_m, z_m)$ of the transmitter.

For example, for a network formed by N=2 sensors spaced out by a distance of d in the axis of the carrier, the direction vector verifies $a_{kp(k)m}$.

$$a_{kp(k)m} = \begin{bmatrix} 1 \\ \exp(j2\pi \dfrac{d}{\lambda_{p(k)}} \cos(\theta(t_k, x_m, y_m, z_m)) \cos \\ (\Delta(t_k, x_m, y_m, z_m))) \end{bmatrix} \quad (9)$$

$$= a(t_k, \lambda_{p(k)}, x_m, y_m, z_m)$$

According to FIG. 1, the incidence $(\theta(t_k, x_m, y_m, z_m), \Delta(t_k, x_m, y_m, z_m))$ may be computed directly from the position $(x_k, y_k, z_k)$ of the carrier at the instant $t_k$ and the position $(x_m, y_m, z_m)$ of the transmitter.

The method will, for example, build a vector $b_{kp(k)m}$ from components of the vector $a_{kp(k)m}$. The vector $b_{kp(k)m}$ may be a vector with a dimension $(N-1) \times 1$ in choosing the reference sensor in n=i:

$$b_{kp(k)m} = \begin{bmatrix} a_{kp(k)m}(1)/a_{kp(k)m}(i) \\ M \\ a_{kp(k)m}(i-1)/a_{kp(k)m}(i) \\ a_{kp(k)m}(i+1)/a_{kp(k)m}(i) \\ M \\ a_{kp(k)m}(N)/a_{kp(k)m}(i) \end{bmatrix} \quad (10)$$

$$= b(t_k, \lambda_{p(k)}, x_m, y_m, z_m)$$

where $a_{kp(k)m}(n)$ is the $i^{th}$ component of $a_{kp(k)m}$.

Thus, in the example of the equation (9) and in fixing i=1 we get:

$$b_{kp(k)m} = \begin{bmatrix} \exp(j2\pi \frac{d}{\lambda_{p(k)}} \cos(\theta(t_k, x_m, y_m, z_m)) \cos \\ (\Delta(t_k, x_m, y_m, z_m))) \end{bmatrix} \quad (11)$$

It being known that the direction vectors $a_{kp(k)m}$ are estimated with a certain error $e_{kp(k)m}$ such that $a_{kp(k)m}=a(t_k,\lambda_{p(k)},x_m,y_m,z_m)+e_{kp(k)m}$. The same is true for the transformed vector $b_{kp(k)m}$ of (10) at the first order when $\|e_{kp(k)m}\|<<1$.

$$b_{kp(k)m}=b(t_k,\lambda_{p(k)},x_m,y_m,z_m)+w_{km} \quad (12)$$

The family of localizing techniques mentioned in the prior art, using the phase shift between two sensors, requires knowledge of the phase of the vector $b_{kp(k)m}$. It being known that the vector $a_{kp(k)m}$ is a function of the position $(x_m,y_m,z_m)$ of the transmitter, the same is true for the vector $b_{kp(k)m}$.

Under these conditions, the localisation method consists, for example, in maximizing the following criterion of standardized vector correlation $L_K(x,y,z)$ in the position space $(x,y,z)$ of a transmitter.

$$L_K(x, y, z) = \frac{|b_K^H v_K(x, y, z)|^2}{(b_K^H b_K)(v_K(x, y, z)^H v_K(x, y, z))} \quad \text{with} \quad (13)$$

$$b_K = \begin{bmatrix} b_{1m} \\ M \\ b_{Km} \end{bmatrix}$$

$$= v_K(x_m, y_m, z_m) + w_K, \quad v_K(x, y, z)$$

$$= \begin{bmatrix} b(t_1, \lambda_{p(1)}, x, y, z) \\ M \\ b(t_K, \lambda_{p(K)}, x, y, z) \end{bmatrix}$$

and $$w_K = \begin{bmatrix} w_{1m} \\ M \\ w_{Km} \end{bmatrix}$$

The noise vector $w_K$ has the matrix of covariance $R=E[w_K w_K^H]$.

Assuming that it is possible to know this matrix R, the criterion may be envisaged with a whitening technique.

In these conditions, the following criterion $L_K'(x,y,z)$ is obtained $$L_K'(x, y, z) = \frac{|b_K^H R^{-1} v_K(x, y, z)|^2}{(b_K^H R^{-1} b_K)(v_K(x, y, z)^H R^{-1} v_K(x, y, z))} \quad (14)$$

with $R = E[w_K w_K^H]$

The vector $V_K(x,y,z)$ depends on the K wavelengths $\lambda_{p(1)}$ up to $\lambda_{p(K)}$. This is why it is said that the method achieves a broadband localisation.

The criteria $L_K(x,y,z)$ and $L_K'(x,y,z)$ have the advantage of enabling the implementation of a localization technique in the presence of a network of sensors calibrated in space $(\theta,\Delta)$ at various wavelengths $\lambda$.

Given that, at the instant $t_k$, we know the analytic relationship linking the incidence $(\theta(t_k,x,y,z), \Delta(t_k,x,y,z))$ of the transmitter with its position $(x,y,z)$, it is then possible, from the incidence $(\theta(t_k,x,y,z), \Delta(t_k,x,y,z))$, to deduce the vector $a(t_k, \lambda_{p(k)},x_m,y_m,z_m)=a(\theta(t_k,x,y,z), \Delta(t_k,x,y,z),\lambda_{p(k)})$ in making an interpolation of the calibration table in the 3D space $(\theta,\Delta,\lambda)$.

In an airborne context, the knowledge of the altitude h of the aircraft reduces the computation of the criterion in the search space $(x,y)$, assuming $z=h$.

In the example of the equations (9) and (11) the vector $v_K(x,y,z)$ is written as follows:

$$v_K(x, y, z) = \quad (15)$$

$$\begin{bmatrix} \exp\left(j2\pi \frac{d}{\lambda_{p(1)}} \cos(\theta(t_1, x, y, z))\cos(\Delta(t_1, x, y, z))\right) \\ M \\ \exp\left(j2\pi \frac{d}{\lambda_{p(K)}} \cos(\theta(t_K, x, y, z))\cos(\Delta(t_K, x, y, z))\right) \end{bmatrix}$$

In this method, it is possible to consider initialising the algorithm at $K=K_0$ and then recursively computing the criterion $L_K(x,y,z)$.

Thus, $L_K(x,y,z)$ is computed recursively as follows:

$$L_{K+1}(x, y, z) = \frac{|\alpha_{K+1}(x, y, z)|^2}{\beta_{K+1} \gamma_{K+1}(x, y, z)} \quad \text{where} \quad (16)$$

$$\alpha_{K+1}(x, y, z) = \alpha_K(x, y, z) +$$
$$b_{K+1p(K+1)m}^H b(t_{K+1},\lambda_{p(K+1)}, x, y, z)$$

$$\gamma_{K+1}(x, y, z) = \gamma_K(x, y, z) + b(t_{K+1}, \lambda_{p(K+1)}, x, y, z)^H$$
$$b(t_{K+1}, \lambda_{p(K+1)}, x, y, z)$$

$$\beta_{K+1} = \beta_K + b_{K+1p(K+1)m}^H b_{K+1p(K+1)m}$$

When the vectors $b(t_{K+1},\lambda_{p(K+1)},x,y,z)$ and $b_{kp(k)m}$ are constant standards equal to $\rho$ the relationship of recurrence of the equation (16) becomes:

$$L_{K+1}(x, y, z) = \frac{|\alpha_{K+1}(x, y, z)|^2}{\beta^2(K+1)^2} \quad (17)$$

Where $$\alpha_{K+1}(x, y, z) = \alpha_K(x, y, z) +$$
$$b_{K+1p(K+1)m}^H b(t_{K+1}, \lambda_{p(K+1)}, x, y, z)$$

The method has been described up to this point in assuming that the transmitters have fixed positions. It can easily be extended to the case of moving targets with a speed vector $(v_{xm},v_{ym},v_{zm})$ for which there is a model of evolution as described in the patent application FR 03/13128.

The method according to the invention can be applied to a very large number of measurements. In this case, the value of K is diminished in order to reduce the numerical complexity of the computations.

The method provides, for example, for the performance of the following processing operations on the elementary measurements:

decimation of the pairs $(t_k, \lambda_{p(k)})$, filtering (smoothing of the measurements which are the direction vectors) and sub-sampling, merging on a defined duration (extraction by association of direction vectors to produce a measurement of synthesis).

BIBLIOGRAPHY

1—R O. SCHMIDT—November 1981—A signal subspace approach to multiple emitter location and spectral estimation
2—J. F. CARDOSO A. SOULOUMIAC—December 1993—Blind beamforming for non-gaussian signals IEE Proceedings-F, Vol. 140, No. 6, pp. 362-370
3—P. COMON—April 1994—Independent Component Analysis, a new concept Elsevier—Signal Processing, Vol 36, no. 3, pp 287-314

What is claimed is:

1. A method for localizing one or more sources, the sources being in motion relative to a network of sensors, the method comprising the following steps:
   separating the sources in order to identify the direction vectors associated with the response of the sensors to a source at a given incidence;
   associating the direction vectors $a_{1p(1)m} \ldots a_{(K)m}$ obtained for the $m^{th}$ source and, respectively, for the instants $t_1 \ldots t_K$ and for the wavelengths $\lambda_{p(1)} \ldots, \lambda_{p(K)}$, and localizing the $m^{th}$ source from the components of the vectors $a_{1p(1)m} \ldots a_{(K)m}$;
   wherein, in considering that, for each pair, $(t_k, \lambda_{p(k)})$, $M_k$ vectors $a_{kp(k)j}$ ($1 \leq j < M_k$) have been identified, where $M_k$ is the number of sources at k, the step of association for K pairs $(t_k, \lambda_{p(k)})$ comprises the following steps:
   1) resetting of the process at k=0, m=1 and number of sources M=1 and, for all triplets $(t_k, \lambda_{p(k)}, j)$, resetting a flag of association with a source flag$_{kj}$ at flag$_{kj}$=0;
   2) searching for an index j and a pair $(t_k, \lambda_{p(k)})$ such that the flag, flag$_{kj}$=0;
   3) for first triplet $(t_k, \lambda_{p(k)}, j)$ obtained at the step 2, effecting flag$_{kj}$=1 and resetting a test flag of association with the source of the first triplet link$_{k'i}$=0 for k'≠k and i'≠j and ind$_m$={k} and $\Phi_m$={$a_{kp(k)j}$};
   4) determining the pair $(t_{k'}, \lambda_{p(k')})$ minimizing a distance $d_{kk'}$ between pairs $(t_{k'}, \lambda_{p(k')})$ and $(t_k, \lambda_{p(k)})$ such that k∈ind$_m$ in the time-frequency space and in which there exists at least one vector $b_i = a_{k'p(k')i}$ such that flag$_{k'i}$=0 and link$_{k'i}$=0;
   5) in using the relationship (4) defined here above, determining the index i(m) that minimizes the difference between the vectors $a_{kp(k)m}$ such that k∈ind$_m$ and the vectors $b_i$ identified with the instant-wavelength pairs $(t_{k'}, \lambda_{p(k')})$ for ($1 < i < M_{k'}$) and flag$_{k'i}$=0 and link$_{k'i}$=0;
   6) setting link$_{k'i(m)}$=1: the test of association has been performed;
   7) if $d(a_{kp(k)m}, b_{i(m)}) < \eta$ and $|t_{k'} - t_k| < \Delta t_{max}$ then: $\Phi_m = \{\Phi_m b_{i(m)}\}$, ind$_m$={ind$_m$k'}, flag$_{k'i(m)}$=1;
   8) if there is at least one doublet $(t_{k'}, \lambda_{p(k')})$ and one index i such that link$_{k'i}$=0, then repeating the steps from the step 4;
   9) defining the family of vectors $\Phi_m = \{a_{1p(1)m} \ldots a_{K(m),p(K(m)),m}\}$ associated with the source indexed by m in writing K(m)=cardinal($\Phi_m$); and
   10) from the family of vectors $\Phi_m = \{a_{1p(1),m} \ldots a_{K(M),p(K(M)),m}\}$, extracting the J instants $t_j \in \text{ind}_J \subset \text{ind}_m$ which correspond to aberrant points located outside a defined zone;
   11) returning to the step 3) if there is at least one triplet $(t_k, \lambda_{p(k)}, j)$ such that flag$_{kj}$=0.

2. The method according to claim 1 wherein the localizing step comprises the following steps:
   maximizing a criterion of standardized vector correlation $L_K(x,y,z)$ in the position space (x,y,z) of a source with $$L_K(x, y, z) = \frac{|b_K^H v_K(x, y, z)|^2}{(b_K^H b_K)(v_K(x, y, z)^H v_K(x, y, z))} \text{ with}$$

$$b_K = \begin{bmatrix} b_{1m} \\ \vdots \\ b_{Km} \end{bmatrix}$$

$$= v_K(x_m, y_m, z_m) + w_K, v_K(x, y, z)$$

$$= \begin{bmatrix} b(t_1, \lambda_{p(1)}, x, y, z) \\ \vdots \\ b(t_K, \lambda_{p(K)}, x, y, z) \end{bmatrix} \text{ and}$$

$$w_K = \begin{bmatrix} w_{1m} \\ \vdots \\ w_{Km} \end{bmatrix}$$

where $W_k$ is the noise vector for all the positions (x, y, z) of a source.

3. The method according to claim 2, wherein the vector $b_K$ comprises a noise-representing vector whose components are functions of the components of the vectors $a_{1m} \ldots a_{Km}$.

4. The method according to claim 3, comprising a step to compare the maximum values with a threshold value.

5. The method according to claim 3, wherein the transmitters to be localized are mobile and wherein the vector considered is parametrized by the position of the source to be localized and the speed vector.

6. A method according to claim 2, comprising a step in which the matrix of covariance $R = E[W_K W_K^H]$ of the noise vector is determined, and wherein the following criterion is maximized $$L'_K(x, y, z) = \frac{|b_K^H R^{-1} v_K(x, y, z)|^2}{(b_K^H R^{-1} b_K)(v_K(x, y, z)^H R^{-1} v_K(x, y, z))}.$$

7. The method according to claim 6, wherein the assessment of the criterion $L_K(x,y,z)$ and/or the criterion $L'_K(x,y,z)$ is recursive.

8. The method according to claim 7, comprising a step to compare the maximum values with a threshold value.

9. The method according to claim 7, wherein the transmitters to be localized are mobile and wherein the vector considered is parametrized by the position of the source to be localized and the speed vector.

10. The method according to claim 6, comprising a step to compare the maximum values with a threshold value.

11. The method according to claim 6, wherein the transmitters to be localized are mobile and wherein the vector considered is parametrized by the position of the source to be localized and the speed vector.

12. The method according to claim 2, comprising a step to compare the maximum values with a threshold value.

13. The method according to claim 2, wherein the transmitters to be localized are mobile and wherein the vector considered is parametrized by the position of the source to be localized and the speed vector.

14. The method according to claim 1, comprising a step to compare the maximum values with a threshold value.

15. The method according to claim 14, wherein the transmitters to be localized are mobile and wherein the vector considered is parametrized by the position of the transmitter to be localized and the speed vector.

16. The method according to claim 1, wherein the transmitters to be localized are mobile and wherein the vector considered is parametrized by the position of the source to be localized and the speed vector.

17. The method according to claim 1, comprising a step to compare the maximum values with a threshold value.

18. The method according to claim 1, wherein the transmitters to be localized are mobile and wherein the vector considered is parametrized by the position of the source to be localized and the speed vector.

* * * * *